Oct. 11, 1966     L. HELLER     3,277,955
CONTROL APPARATUS FOR AIR-COOLED STEAM CONDENSATION SYSTEMS
Filed Nov. 1, 1961     3 Sheets-Sheet 1

INVENTOR.
Laszlo Heller
BY Blum, Moscovitz,
Friedman & Blum
ATTORNEYS

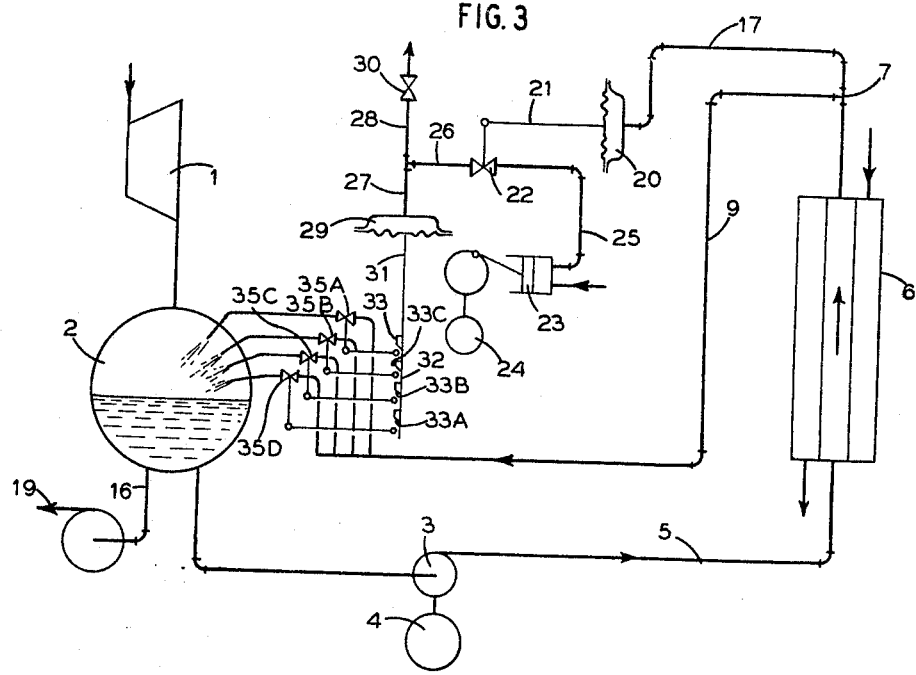
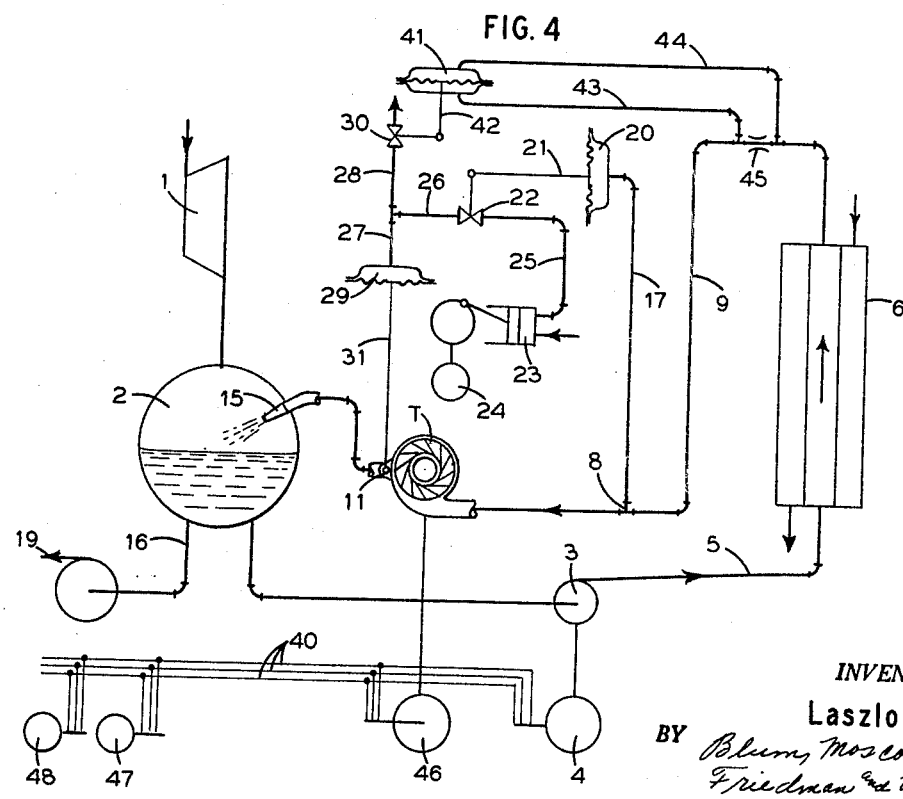

Oct. 11, 1966 L. HELLER 3,277,955
CONTROL APPARATUS FOR AIR-COOLED STEAM CONDENSATION SYSTEMS
Filed Nov. 1, 1961 3 Sheets-Sheet 3

INVENTOR.
Laszlo Heller
BY Blum, Moscovitz,
Friedman and Blum
ATTORNEYS

United States Patent Office 3,277,955
Patented Oct. 11, 1966

3,277,955
CONTROL APPARATUS FOR AIR-COOLED STEAM CONDENSATION SYSTEMS
Laszlo Heller, 45 Bimbo-ut, Budapest, Hungary
Filed Nov. 1, 1961, Ser. No. 149,445
8 Claims. (Cl. 165—40)

This invention relates to steam power plants utilizing mixing condensers and, more particularly, to an improved arrangement for preventing air leakage into the condensate recirculating system. The present application is a continuation in part of my copending application, now abandoned, Serial No. 554,832, filed December 22, 1955, for "Control Apparatus for Air-Cooled Steam Condensation Systems."

It is known in steam power plants to use mixing condensers in which the exhaust steam is condensed by means of a condensate serving as cooling water, and to recool the thus heated condensate in a closed system and by means of atmospheric air. One of the very important problems in such systems is to prevent leakage of air into the system, due to minute leaks or lack of tight fittings in the condensate recirculation system or loops, during the recooling of the condensate by atmospheric air. For this reason, precautions have to be taken so that, during recirculation of the condensate, as it leaves the mixing condenser and passes through the circulating pump and the recooling surfaces back to the mixing condenser, the pressure in the recirculating loop exceeds the ambient atmospheric pressure to an extent sufficient to prevent air leakage into the system. For economical reasons, it is desirable that this superatmospheric pressure should exceed the ambient atmospheric pressure, by as small a value as possible. Consequently, it is necessary to maintain this minimum value of the excess pressure at a predetermined value by suitable automatic regulation which takes into consideration any possible variation in the system load. The maintenance of this excess pressure at the minimum value is complicated by the fact that, particularly when the load changes at individual points of the loop, such as at any point along the flow path of the condensate, the pressure may drop below the ambient atmospheric pressure.

In accordance with the present invention, it has been determined that assurance of maintenance of the excess pressure at the minimum value throughout the condensate circulating loop can be attained by connecting the pressure sensing impulse transmitting means, or transducer, for the control apparatus to a point in the loop where the pressure prevailing in the condensate is always at its smallest value irrespective of the loading and under all loading conditions. Hydrodynamic considerations show that this point is always the highest point, geodetically speaking, of the entire loop.

More particularly, in accordance with the present invention, the automatic pressure controlling apparatus has its control member receiving a pressure sensing pulse or control signal from a pressure sensing means or transducer connected to the loop at the highest geodetic point thereof. The control apparatus itself consists, essentially, in adjustable throttling means in the loop in advance of the condenser, such as a suitable valve or group of valves, adjusted in dependence upon the amount of the circulating condensate, the ambient temperature, and the load on the turbine, so that the pressure prevailing at the point where the pressure is sensed is always maintained at a predetermined value in excess of the ambient atmospheric pressure. As mentioned, this point is the point of lowest pressure in the condensate circulating system, and it is thus insured that the pressure of the condensate in all of the recirculating systems is always greater than ambient atmospheric pressure. It is within the scope of the invention to substitute, for the valve or group of valves, a variable speed water turbine or the like performing the same function as the valve or group of valves. If the pressure is sensed at a point other than the highest geodetic level, the servomotor system for adjusting the throttling means is compensated to take into consideration the difference in elevation and the flow resistance between such other point and the highest geodetic level of the loop.

For an understanding of the principles of the invention, reference is made to the following description of typical embodiments thereof as illustrated in the accompanying drawings. In the drawings:

FIGS. 1, 2 and 3 are schematic diagrams of exhaust steam condensation systems, illustrating different embodiments of the controlling arrangement of the present invention;

FIG. 4 is a view similar to FIGS. 1, 2 and 3 illustrating a further embodiment of the invention.

Figure 1:
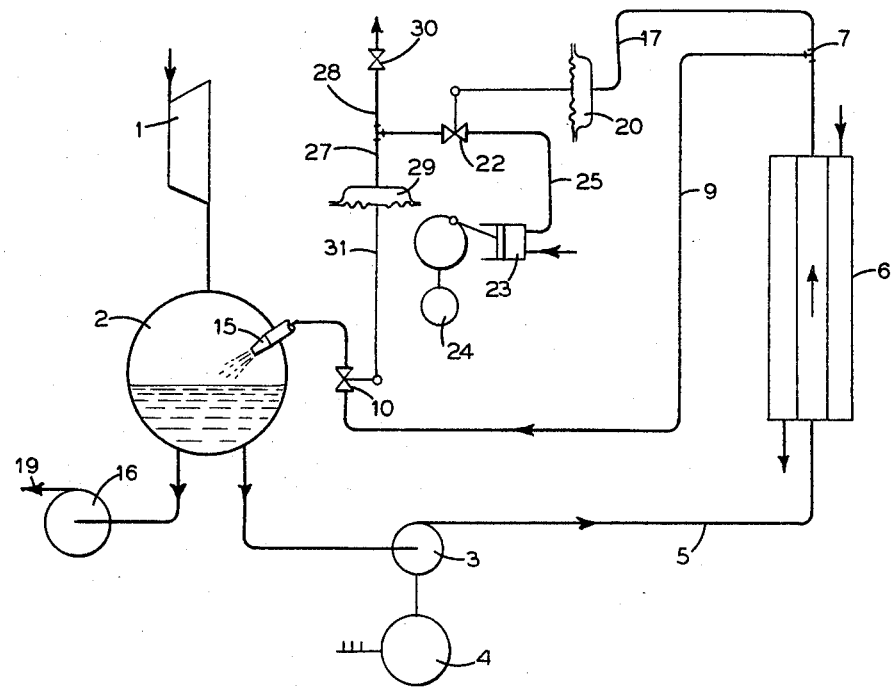

In each of the embodiments shown in FIGS. 1, 2, 3 and 4, exhaust steam from steam turbine 1 is condensed in a mixing condenser 2. Part of the mixture consisting of the precipated water and the cooling water is delivered by feed pump 16 and pipe or conduit 19 to the boiler or steam generator, while the other part of the mixture is circulated through the pump 3 and the condensate withdrawal pipe or conduit 5 to the air cooled heat exchangers 6. The condensate is cooled in the heat exchangers 6 and flows through the condensate return pipe or conduit 9 back to the mixing condenser 2. An automatically controlled flow-controlling means or throttling means is interposed in conduit 9 directly in advance of mixing condenser 2, and this throttling means is adjusted in accordance with a control signal corresponding to the pressure at the highest point 7 of the condensate recirculating loop. If the amount of the circulating water changes, either due to a variation in the turbine load or to a change in the ambient temperature of the atmospheric air, the flow-controlling means is automatically adjusted so that the desired minimum superatmospheric pressure is always maintained at the point 7. Since the pressure at other points in the recirculating loop is always in excess of the pressure at the point 7, this insures that, in the entire loop involving the pump 3 and heat exchangers 6 and up the flow-controlling or throttling means, the pressure of the circulating water is greater than the ambient atmospheric pressure.

Referring more particularly to the embodiment of the invention shown in FIG. 1, the flow-controlling means disposed directly in advance of the condenser 2 comprises a valve 10 controlling the discharge of a nozzle 15. It will be noted that, between valve 10 and the point 7, which latter is at the highest geodetic level of the system, there are disposed known controlling means or a known servomotor system for varying the adjustment of valve 10 in accordance with the pressure existing at the point 7. Thus, a conduit 17 applies the pressure existing at the point 7 to the chamber of a pressure responsive transducer, such as a bellows 20, whose diaphragm is connected by a rod 21 to the operating member for a variable flow valve 22. Valve 22 is the valve for controlling the operation of valve 10. Consequently, the bellows 20 constitutes a sensing device for deriving a control impulse or signal from the pressure prevailing at the point 7 and for applying this control impulse or signal to adjust the valve 10.

A conduit 25 connects the inlet of valve 22 to the outlet of an air compressor 23 whose inlet is open to atmosphere. Air compressor 23 is driven at a constant speed by electric motor 24 receiving its supply potential from the power network. The outlet of valve 22 is connected by a conduit 26 to conduits 27 and 28. Conduit 27 is connected to the pressure chamber of a suitable pressure responsive means 29 whose diaphragm is connected by a rod 31 to an operating arm for the valve 10. Conduit 28 is connected to atmosphere through an adjustable valve 30. In this embodiment, the circulating pump 3 is driven by an electric motor 4 receiving its supply potential from the power network.

In the operation of the embodiment of the invention shown in FIG. 1, compressor 23 supplies compressed air, through conduit 25, valve 22 and conduits 26 and 27, to the chamber of bellows 29, and through conduit 28 and valve 30 to atmosphere. Thus, the pressure in chamber of bellows 29 and in conduits 26, 27 and 28 will depend on the adjustment of valve 30, whereby, with the air compressor 23 being operated at constant speed, the quantity of air flowing in the conduit 25 will depend only upon the pressure prevailing in this conduit. The upper limit of the pressure prevailing downstream of the valve 22 is dependent upon the adjustment of valve 30, so that, by adjustment of valve 30, it is possible to regulate the pressure at which the valve 10 occupies its predetermined or precalculated position.

If the superatmospheric pressure prevailing at point 7 corresponds to a predetermined or precalculated value as adjusted by valve 30, the diaphragms of bellows 20 and 29 will occupy their predetermined positions, and thus the valve 10 will occupy a position wherein the pressure prevailing upstream thereof in the conduit 9 will have the predetermined required superatmospheric value.

If, however, the pressure between the pump 3 and the valve 10 increases, as for example due to an increase of the load of turbine 1, the pressure in the bellows 20 will increase so that the diaphragm thereof will be moved outwardly. This outward movement is transmitted by rod 21 to the regulating arm of valve 22 to increase the opening of this valve. Thus, more compressed air is permitted to pass through the valve 22 so that the pressure prevailing in conduit 26 and in conduits 27 and 28 increases. As the adjustment of valve 30 is still unchanged, the pressure prevailing in the bellows 29 increases and the diaphragm thereof is thus moved outwardly. This outward movement shifts the rod 31 downwardly, as viewed in FIG. 1, and causes an adjustment of valve 30 in a direction to increase the flow therethrough. Due to the increased degree of opening of the valve 10, more condensate will pass therethrough and, accordingly, the pressure upstream of valve 10 will drop by a corresponding amount. This pressure drop upstream of the valve 10 will continue until the diaphragm of the bellows 20 resumes its original position. The decrease of pressure in the loop upstream of the valve 10 is communicated through conduit 17 to the pressure response means 20, so that the diaphragm of bellows 20 will resume its original position corresponding to the preset value of super-atmospheric pressure at the point 7 as set by adjustment of valve 30. Compensation of the pressures prevailing in the conduits 9 and 17, respectively, having taken place, the recirculating loop operates under the original working conditions wherein the pressure prevailing at point 7 exceeds the ambient atmospheric pressure by the value determined by adjustment of valve 30.

Under the converse conditions, wherein the rate of flow of condensate between the pump 3 and the valve 10 decreases as, for example, due to a decrease of the load on turbine 1, the pressure at point 7 decreases and thus the pressure within the device 20 is decreased so that the diaphragm of the latter moves inwardly. This inward movement shifts rod 21 in the righthand direction, as viewed in FIG. 1, and thereby adjusts control valve 22 so as to throttle the flow of compressed air therethrough. Thus, the pressure in conduits 26, 27, and 28, and in the chamber of the control device 29, is reduced so that the diaphragm of device 29 moves inwardly and stays inwardly as long as the pressure between the valve 22 and the valve 30 is lower than its initial predetermined value. The inward movement of the diaphragm of the bellows 29 shifts the rod 31 upwardly, as viewed in FIG. 1, so that the valve 10 is adjusted in a direction contrary to its former adjustment to decrease the flow therethrough. Accordingly, the pressure upstream of the valve 10 increases, and this increased pressure, as communicated from point 7 through conduit 17 to the device 20, causes the diaphragm of the latter to move outwardly toward its initial position so that valve 22 is operated, through rod 21, to resume its original position. As soon as the pressure upstream of the valve 30 attains its original value, at which a further increase of pressure causes air to flow through conduit 28 and valve 30 into atmosphere, the adjustment of valve 22 is terminated and the pressure conditions in the recirculating loop resume the original value. Thereby, the pressure at point 7 is readjusted to its preset value as determined by the adjustment of valve 30. From the foregoing, it will be apparent that, by adjustment of valve 30, it is possible to present the superatmospheric pressure at point 7 at a predetermined value which may be called the nominal value of control pressure and which is automatically maintained under all load conditions.

The details of the specific control system interposed between the point 7 and the valve 10 to regulate the position of valve 10 in accordance with the pressure conditions prevailing at the point 7 form no part of the present invention, and have been known to those skilled in the art since before the filing date of applicant's said copending application. For example, such a control system is disclosed in FIG. 11.1 on page 52 of "Kleines Handbuck Technischer Regelvorange" by Winfred Oppelt, published by Verlag Chemie GMBH Weinheim/Bergstr., in 1954. It will be readily apparent that the righthand portion of FIG. 11.1 on page 52 of the publication illustrates the entire control or servomotor system shown in FIG. 1 as interposed between point 7 and the valve 10.

Figure 2:
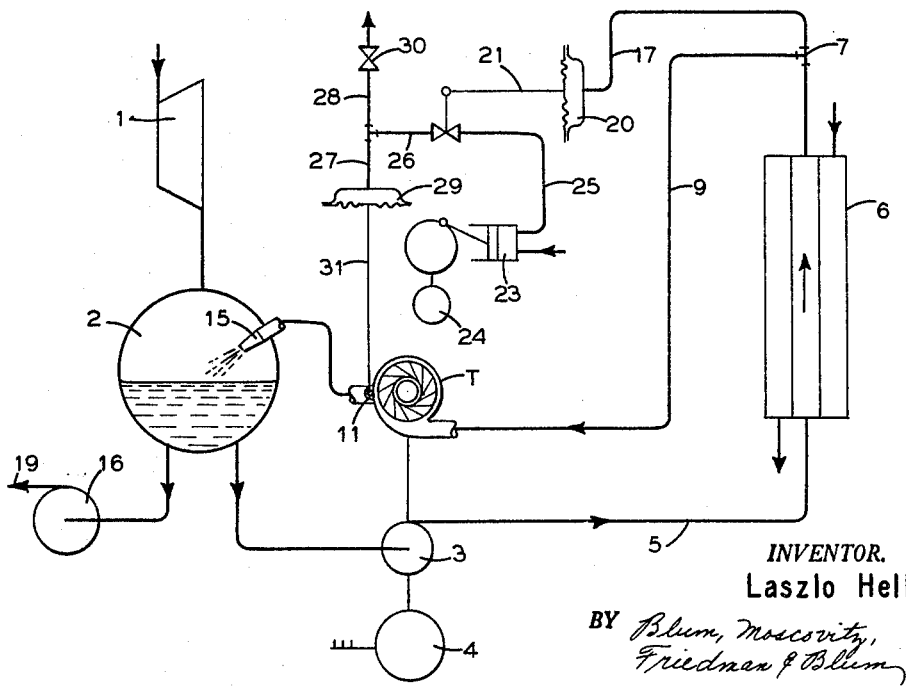

In steam power plants of higher capacity, it is preferable to substitute, for the valve or valves 10, a water turbine T as shown in FIG. 2, and which utilizes the potential energy of recirculating condensate to generate electric current. This water turbine may also be used for directly driving the pump 3 so that a portion of the power required for operating pump 3 is obtained from the turbine T. In this case, the control or servomotor system between the point 7 and the turbine T, and which corresponds exactly to the servomotor system of FIG. 1, is utilized to controllably operate the inlet means of the water turbine T. Such a regulation involving the inlet means for water turbines is shown, for example, in FIG. 3.5 on page 24 of the above-mentioned publication, in the upper righthand corner of the figure. As stated, in the publication text pertaining to FIG. 3.5 thereof, in controlling the speed of a water turbine, the inlet thereof is adjusted by the illustrated control system. Control impulses derived from the torque of the turbine shaft and from the water pressure are used. In contradistinction, in the present invention, the water turbine is controlled dependent upon the pressure prevailing upstream thereof, which is a novel feature of the invention with respect to embodiments thereof utilizing water turbines as the adjustable throttling means for the condensate flow. Other than this, the embodiment of the invention shown in FIG. 2 operates in the same manner as does the embodiments of the invention shown in FIG. 1, to maintain the superatmospheric pressure at the point 7 at a predetermined value set by adjustment of the valve 30.

The embodiment of the invention shown in FIG. 3 is essentially similar to those shown in FIGS. 1 and 2. However, in this case, instead of the throttling means comprising a valve 10, as in FIG. 1, or a water turbine T, as in FIG. 2, there are a series of valves 35A through 35D connected in parallel to the pipe or conduit 9. There is also a bank of spray nozzles 15 each controlled by one of the valves 35A through 35D, the spray nozzles 15 thus being connected in parallel to the conduit 9. The valves 35A through 35D are operated through the medium of the rod 31, as in the arrangement shown in FIGS. 1 and 2. The operating means is so constructed and arranged that, during opening of the valves, the valves are opened sequentially with each valve being opened only after the preceding valve has been fully opened, and conversely during closing of the valve.

Such sequential operation is effected by the profile element 32 connected to the rod 31 and formed with cam surfaces 33A through 33D each associated with one of the valves 35A through 35D. The respective inner surfaces of the cam portions 33A through 33D increase in length in the direction of movement of the profile element 32 during opening of the respective valves, and the length of the outer surfaces of the cam portions increase in length in the direction of valve closing movement of profile 32.

Figure 3A:
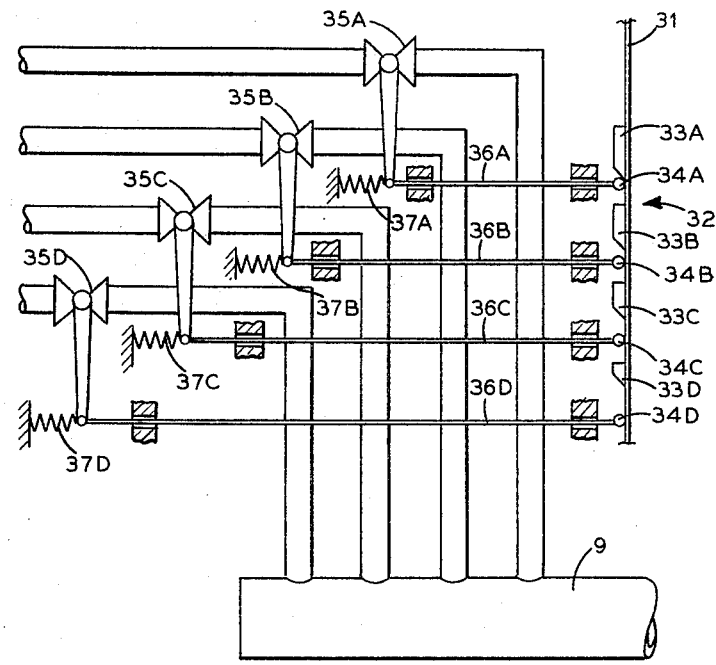
FIGS. 3a, 3b and 3c are enlarged partial schematic diagrams, corresponding to FIG. 3, illustrating different stages in the operation of the controlling arrangement of FIG. 3.
Figure 3B:
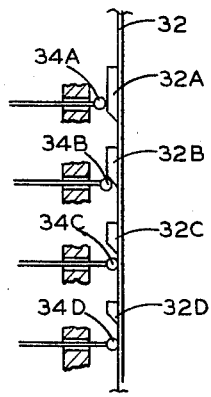
Figure 3C:
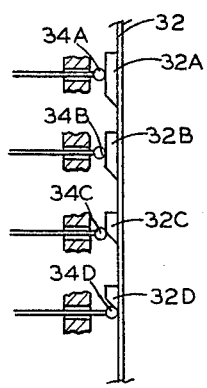

Referring to FIGS. 3a through 3c, it will be noted that rollers 34A through 34D on the free ends of operating rods 36A through 36D engage the cam surfaces, the rollers being maintained in contact with the cam surfaces by means of springs 37A through 37D. FIG. 3a shows the inoperative or neutral position of the cam or profile element 32, wherein each of the rollers 34A through 34D is in contact with an inner surface of the associated profile cam 33A through 33D.

In FIG. 3b, the position illustrated is that in which the roller 34A is engaging the outer surface of the profile cam 33A so that the associated valve 35A is at the limit of its opening movement under the influence of the control system. Also, the roller 34B is engaging the sloping portion of the profile cam 33B so that the associated valve 35B is intermediate its limiting closing and opening positions as controlled by the control mechanism.

FIG. 3c illustrates the start of opening operation of the valve 35D, while the rollers associated with the other three valves are already on the outer portions of the associated profile cam so that the other three valves have reached the limit of opening movement under the influence of the control mechanism.

The particular mechanism for operating the valves 35A through 35D is known to the prior art prior to the filing date of applicant's said copending application. For example, an arrangement corresponding to the profile element 32 is shown in FIG. 3.5 on page 24 of the above-mentioned publication, particularly in the middle figure of the left hand column of figures.

FIG. 4 shows an arrangement which is generally similar to the arrangement shown in FIG. 2 but in which the pressure of the system is sensed at a point 8 other than the highest geodetic point of the system. However, the arrangement of FIG. 4 takes into consideration the hydrostatic conditions, such as the weight of the water column in the upright portion of the main conduit 9 and the flow resistance thereof, between the highest geodetic level and the point 8, this consideration being effected automatically.

In the embodiment of FIG. 4, the pressure sensing conduit 17 is connected to conduit 9 at the point 8 which is, in the particular arrangement shown, at a lower elevation than the highest geodetic point of the recirculating system. The operation of the control instrumentality in accordance with pressure variations at the point 8 is the same as previously described for FIGS. 1, 2 and 3. However, the difference in pressure between the highest geodetic point and the point 8 must be taken into consideration, and this can be done by suitable adjustment of the valve 30.

For this purpose, a double acting pressure responsive device or bellows 41 is provided and an operating rod 42 is connected to the diaphragm of the device 1 and to an operator for the valve 30. Thus, by operation of the device 41, the valve 30 may be adjusted to vary the operating conditions in the system. A pair of conduits 43 and 44 are connected to the device 41 on opposite sides of the diaphragm of the latter, and the other ends of the conduits are connected to the conduit 9 at the highest geodetic level thereof and on opposite sides of a restriction 45 in the conduit. Specifically, conduit 43 is connected to the downstream side of the restriction 45 and conduit 44 is connected to the upstream side of the restriction 45.

In the operation of the arrangement shown in FIG. 4, if the rate of water or condensate flow in conduit 5 is increased, there will be a correspondingly increased pressure drop in the conduit 9. Thus, if the pressure at the highest geodetic level of the conduit 9 remains unaltered, the pressure at the point 8 will be decreased. Accordingly, the system has to be adjusted so that a suitably reduced pressure value is maintained at the point 8. This is effected by virtue of the fact that the pressure drop across the restriction 45, due to the increased flow of condensate, increases, thus increasing the difference between the pressures prevailing in the conduits 43 and 44 respectively. The increase of the pressure difference across the diaphragm of the device 41 causes this diaphragm, and its rod 42, to be displaced downwardly as viewed in FIG. 4. Such downward movement of the rod 42, which is connected to the operator for the valve 30, adjusts the degree of opening of the valve 30 in such a manner that, despite the increased flow resistance along the conduit 9, the pressure at the point 8 will have a value at which the pressure at the highest geodetic level remains constant at the pre-set superatmospheric value.

Also in the arrangement of FIG. 4, the water turbine T drives an alternator 46 instead of driving the pump 3 as in the embodiment of FIG. 2. As turbine T is regulated so as to maintain the pressure upstream thereof at a constant value, the alternator 46 has to work in parallel connection with further alternators 47 and 48 supplying the same power network 40. The electric motor 4 driving the pump 3 has its supply potential derived from the network 40 and thus receives the power developed by the pressure drop across turbine T as represented by the output of the alternator 46.

While specific embodiments of the invention have been shown and described in detail to illustrate the application of the principles of the invention, it will be understood that the invention may be embodied otherwise without departing from such principles.

What is claimed is:

1. A system for condensing steam in a mixing condenser by means of a liquid condensate of the steam, and cooling the liquid condensate mixture in an air cooled heat exchanger, said system comprising a closed loop including said condenser, a circulating pump receiving condensate mixture from said condenser for circulating said condensate mixture, said air cooled heat exchanger communicating, at its inlet, with said pump, flow controlling means communicating between the outlet of said heat exchanger and said mixing condenser proximate to said mixing condenser, transducer means communicating with the line between said heat exchanger outlet and said flow controlling means to provide a control signal proportional to the absolute pressure in said loop at the highest geodetic level thereof, and a servomotor system controlling said flow controlling means and responsive to said transducer means to maintain the pressure at the highest geodetic level of said loop at a superatmospheric value, whereby the pressure at all points in said loop between said pump and said flow controlling means in the direction of condensate flow will be maintained at a superatmospheric value.

2. In an exhaust steam condensation system as claimed in claim 1, said flow controlling means comprising a valve between said heat exchanger and said mixing condenser having an operator connected to said servomotor system.

3. In an exhaust steam condensation system as claimed in claim 1, said flow controlling means comprising a water turbine disposed between said heat exchanger and said mixing condenser and operated by the condensate flow, said water turbine having adjustable inlet means connected to said servomotor system.

4. In an exhaust steam condensation system as claimed in claim 1, said flow controlling means comprising plural valves connected in parallel between said heat exchanger and said condenser; said servomotor system including valve operating means operating said plural valves sequentially in the opening direction and sequentially in the closing direction in such a manner that one valve is fully opened or fully closed before opening or closing movement, respectively, of an adjacent valve is initiated.

5. In an exhaust steam condensation system as claimed in claim 1, the point at which said transducer means communicates with said return conduit being at the highest geodetic level of said loop.

6. In an exhaust steam condensation system as claimed in claim 1, the point at which said transducer means communicates with said return conduit being below the highest geodetic level of said loop; said servomotor system including pressure differential measuring means communicating with said loop at such highest geodetic level thereof and operative to adjust the operation of said servomotor system to compensate for the difference in elevation and flow resistance between said highest geodetic level and said point.

7. In an exhaust steam condensation system as claimed in claim 3, said water turbine being connected to said pump means to provide part of the operating energy for the latter.

8. In an exhaust steam condensation system as claimed in claim 3, said pump means comprising a pump; an electric motor driving said pump at a constant speed and receiving its energizing potential from a power network; and a generator driven by said water turbine and having its output connected to said power network.

References Cited by the Examiner

UNITED STATES PATENTS

| 1,455,633 | 5/1923 | Lundgaard. | |
|---|---|---|---|
| 1,991,309 | 2/1935 | Annin | 137—492.5 |
| 2,356,404 | 8/1944 | Heller | 261—151 |
| 2,369,058 | 2/1945 | Legatski | 165—34 XR |
| 2,619,327 | 11/1952 | Hillier | 165—40 |
| 2,808,234 | 10/1957 | Rosenblad | 165—32 |

ALDEN D. STEWART, *Primary Examiner.*

HARRY B. THORNTON, CHARLES SUKALO,
*Examiners.*